United States Patent [19]

Quist et al.

[11] Patent Number: 4,484,968
[45] Date of Patent: Nov. 27, 1984

[54] METHOD AND APPARATUS FOR COVERING FLEXIBLE SYMMETRICAL ANGULATE TUBES WITH SHEET MATERIAL

[75] Inventors: Bo T. Quist, Veberöd; Jan B. Jeppsson, Lomma; Lars E. Piltz, Dalby, all of Sweden

[73] Assignee: AB Akerlund & Rausing, Sweden

[21] Appl. No.: 328,025

[22] Filed: Dec. 7, 1981

[30] Foreign Application Priority Data

Dec. 15, 1980 [SE] Sweden ................................ 8008799

[51] Int. Cl.³ .................. B29C 17/04; B32B 31/00; B65C 9/06; B65C 3/12
[52] U.S. Cl. ............................... 156/160; 156/213; 156/229; 156/446; 493/297; 493/303; 493/306
[58] Field of Search ................ 156/187, 162, 82, 192, 156/188, 182, 248, 156, 165, 218, 215, 214, 213, 229, 285, 297, 450, 446, 160; 493/295, 297, 303, 306, 305; 264/173, 210.1, 257, 241, 292

[56] References Cited

U.S. PATENT DOCUMENTS

| 3,033,724 | 5/1962 | Stokes | 156/187 |
| 3,610,115 | 10/1971 | Rose et al. | 493/295 |
| 3,619,863 | 11/1971 | Ciabani | 493/295 |
| 3,904,467 | 9/1975 | Srail | 156/229 |
| 3,910,171 | 10/1975 | Reinhardt et al. | 493/295 |
| 4,248,658 | 2/1981 | McGlashen | 156/213 |
| 4,300,963 | 11/1981 | Berg | 156/187 |
| 4,302,275 | 11/1981 | Burmeister et al. | 493/306 |
| 4,347,090 | 8/1982 | Anderson et al. | 156/156 |

Primary Examiner—Edward Kimlin
Assistant Examiner—Louis Falasco
Attorney, Agent, or Firm—Lerner, David, Littenberg, Krumholz & Mentlik

[57] ABSTRACT

The invention relates to the covering with sheet material of flexible symmetrical angulate tubes, especially components of packages. By utilizing the resilient cross-sectional deformability of the tubes, there is provided a method and apparatus where the tube is mounted onto a cylindrical mandrel having a circumference corresponding essentially to the inner circumference of the tube and thereafter applying the sheet material around essentially the entire circumference of the tube.

10 Claims, 2 Drawing Figures

METHOD AND APPARATUS FOR COVERING FLEXIBLE SYMMETRICAL ANGULATE TUBES WITH SHEET MATERIAL

TECHNICAL FIELD

The invention relates to the covering with sheet material of tubes, especially tubes intended as components of packaging containers, and in particular provides a method and apparatus for covering flexible symmetrical angulate tubes (i.e. tubes of angular, as distinct from curvilinear, cross-section, which cross-section is essentially symmetrical and resiliently deformable). The symmetrical angulate tube cross-section might also be referred to as a non-rotational symmetric cross-section.

It is known from, for example, Swedish Pat. No. 75 10170-9 related to U.S. Pat. No. 4,268,336 to provide a packaging container having an angulate casing comprising an inner seamless angulate sleeve of, for example, polypropylene, polyethylene or other suitable extrudable plastics, an intermediate layer of a gas-tight material, for example aluminium foil, and an outer protective plastics layer. The intermediate layer and the outer layer preferably are supplied as a laminate which is applied to the sleeve by adhesive. The angulate, essentially rectangular, cross-sectional shape of the finished container according to said patent is preferable to a curvilinear shape from several points of view. For instance, the volume this type of container occupies during transport, storage, display on shop shelves, etc., is 10–20% less than that of cylindrical cans of the same capacity. The angulate container also has pronounced customer acceptance, not least due to the ease of handling by the customer. Further, the large planar outer surfaces of the container give excellent printing possibilities.

It will be appreciated that there exists an apparent need for said angulate container. In this connection, however, there exists also a need for an effective sheet covering operation which can deal with the angulate shape of said containers. Accordingly, it is an object of the present invention to provide a method and apparatus for said sheet covering operation.

THE STATE OF THE ART AND TECHNICAL PROBLEM

Previously, the sheet covering of said angulate containers has been carried out by stripping an endless web of an aluminium foil laminate from a storage roll whilst controlling the advance speed of the laminate web so that, at the point of contact, the web and the casing (which is rotated to receive the web) have the same speed. The control problem has turned out to be difficult to master because inter alia numerous momentary speed variations are necessary due to the angulate shape. Other operations involving rotation of the angulate casing involve similar difficulties. Further difficulties arise due to radial movements and tension in the laminate web.

SOLUTION AND ADVANTAGES

In order to eliminate, or at least reduce, the difficulties in controlling the advance speed of the laminate web, it is proposed, according to the present invention, to use a method based on the realization that said angulate containers possess a certain flexibility in that they have a resiliently deformable cross-sectional profile. Use of this flexibility is unexpected in view of established sheet covering and lamination techniques because previously it has more or less dictatorially been stipulated that no strains or shearing forces whatsoever may exist in the adhesive layer between the two interconnected and/or laminated webs immediately after the actual covering or lamination operation. However, surprisingly it has been shown that the resilient cross-sectional deformability can be used in a new and unexpected way for sheet covering of angulate tubes, namely by mounting the tube onto a cylindrical mandrel having a circumference corresponding essentially to the inner circumference of the tube and thereafter applying the sheet material around essentially the whole circumference thereof.

The sheet covering preferably is carried out in manner known per se by an adhesive lamination operation using a two-component adhesive.

In order to obtain a gas-tight container, the sheet covering preferably completely covers the circumference of a flexible plastics tube of, for example, a polyolefin, with a gas-tight sheet material, for example a metal foil.

In a practical embodiment of the invention, there is used a sheet material in the form of a laminate of a metal foil and a plastics layer protecting the foil. The laminate is provided with a two-component adhesive on the non-plastics coated side and then is passed through a drying station to remove solvent. The dried laminate is passed in a suitable length to the tube, which is rotated, whereafter the laminate is pressed against the rotating tube by means of, for example, a pressure roll.

It is preferred to apply the laminate in a sufficient length to provide an overlap and to press the joint formed by the overlap against the tube by means of a pressure roll movable axially along the tube.

In the apparatus aspect of the invention, there is provided apparatus for covering with sheet material a tube of angulate, essentially symmetrical and resiliently deformable cross-section by a method of the invention, said apparatus comprising an intermittently rotatable rotor having at least one cylindrical mandrel of a circumference essentially equal to the inner circumference of the tube, means operable in the longitudinal direction of the mandrel to mount the tube onto the mandrel at a supply station, and, at a covering station, means for pressing the sheet material against the tube and means for rotating the mandrel.

In a preferred embodiment of the apparatus aspect, there is also provided feeder means for supplying at the covering station a web of essentially gas-tight sheet material for completely covering the circumference of the tube. Advantageously, there is also provided means for applying onto the sheet material, which has the form of a laminate of a metal foil and a plastics layer protecting the foil, a two-component adhesive on the non-plastics coated side and drying means for removing solvents, the feeding means being arranged to supply the laminate in a suitable length to the tube which, by means of mandrel rotating means, is caused to rotate substantially one turn during simultaneous pressing of the laminate against the tube by the pressure means. Suitably, the mandrel rotating means is arranged to start rotation of the tube-supporting mandrel at a predetermined time before the laminate is pressed against the tube by the pressure means and the apparatus comprises means for treating the tube upstream of the pressure means.

When the sheet material overlaps along a generatrix of the tube, the apparatus preferably comprises a pressure roller movable longitudinally along the tube at the station following the covering station to press an overlap joint of the covering sheet material against the tube.

The following is a description, by way of example only and with reference to the accompanying drawings, of a method and apparatus in accordance with a presently preferred embodiment of the invention.

DESCRIPTION OF THE ACCOMPANYING DRAWINGS

Figure 1:
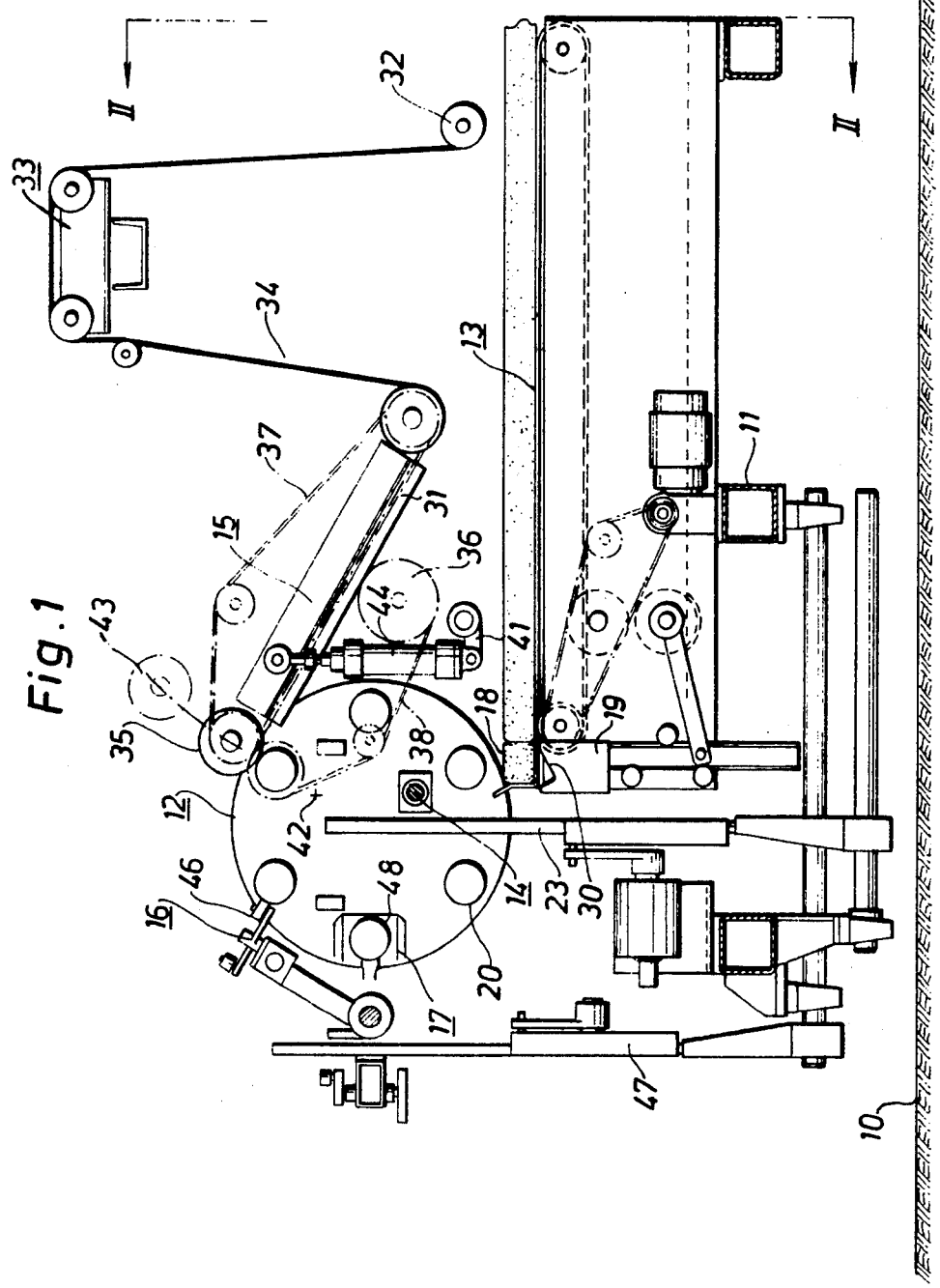
FIG. 1 is a schematic side view of the apparatus.
Figure 2:
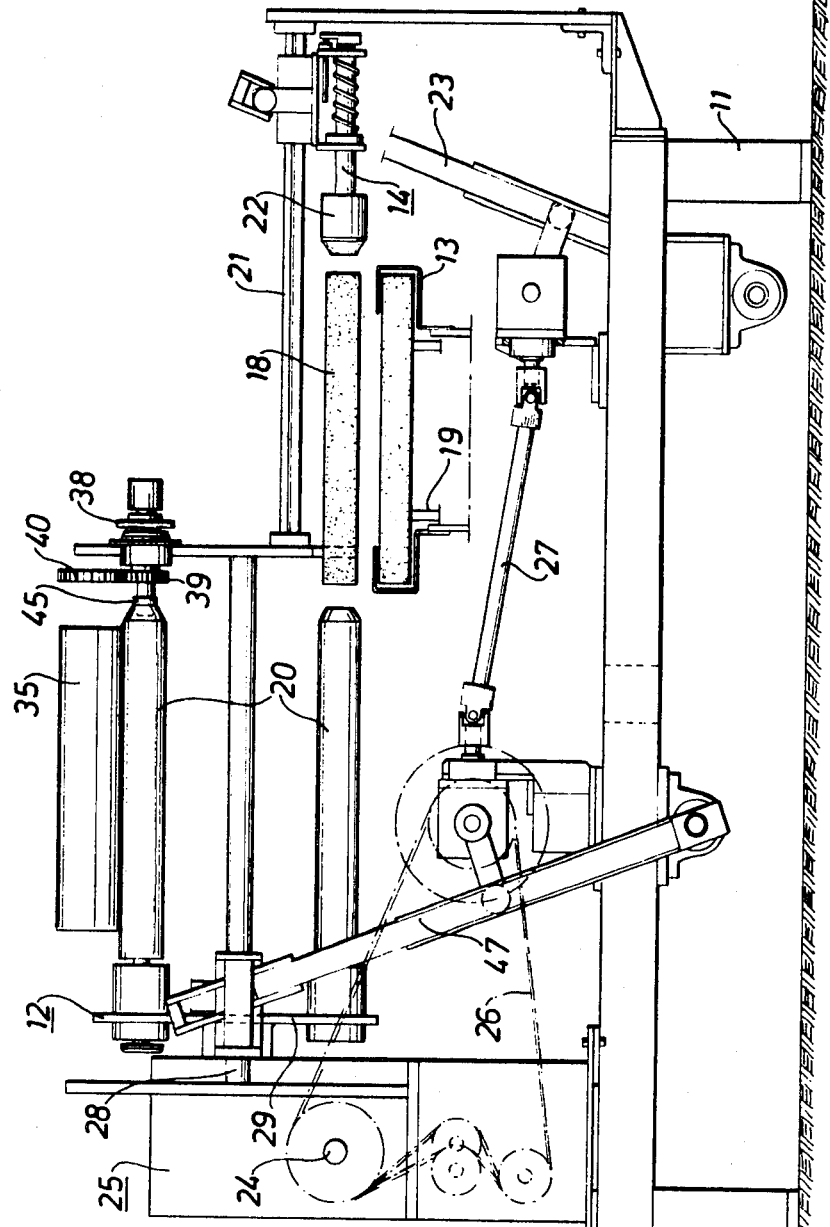
FIG. 2 is a schematic end view of the apparatus in the direction of the arrows II—II in FIG. 1.

Apparatus in accordance with a preferred embodiment of the invention comprises a horizontal support 10 on which a stand 11 supports, as main components, an intermittently rotatable rotary device 12, a supply conveyor 13, a sleeve applicator 14, a sheet covering unit 15, an overlap joint pressure device 16, a sleeve stripper 17 and driving and movement transfer arrangements for said main components.

On the conveyor 13, there are transported, in sequence, sleeves 18 lying adjacent to each other and consisting of, for example, extruded open-ended generally rectangular tubes of polypropylene having a wall thickness of 0.4–0.9 mm and cut into required lengths. By means of a lifting device 19, the foremost sleeve 18 is lifted up to the same height as a cylindrical mandrel 20 rotatably journalled in a support disk 29 of the rotor 12 and a generally conical sleeve applicator head 22 slidable along a fixed shaft 21. The circumference of each mandrel 20 essentially corresponds to the inner circumference of each sleeve 18, whereby the head 22 forces the sleeve 18 onto the mandrel 20 with some cross-sectional deformation of the sleeve.

The translational movement of the head 22 is caused by a link arrangement 23 driven in timed relation relative to the rest of the machinery from an output shaft 24 of an indexing unit 25 via a driving chain 26 and a shaft 27.

The intermittent movement of the rotor 12 also is obtained from the indexing unit 25, which for this purpose is provided with an output stub shaft 28 on which the mandrel supporting disk 29 of the rotor 12 is fixedly attached. The indexing device 25 thus gives the rotor an anti-clockwise stepwise movement to the mandrel positions shown in FIG. 1.

In the mandrel position immediately above the lifting device 19, the foremost sleeve 18 is pushed onto the respective cylindrical mandrel 20. The lifting device 19 has a specially shaped engagement surface 30 so that the sleeve 18 is given a predetermined orientation on the mandrel 20, which is of importance for the sheet covering operation at the covering station 15.

At the mandrel position between the sleeve application station and the station 15 is a position where the presence of the sleeve 18 is detected.

If a sleeve is thus detected, the covering station 15 will be set into operation after the following indexing step. This station comprises a laminate advancement arrangement 31 comprising chains having grip members actuated by tension chains 37 to grip the outer edges of the laminate 34 supplied from a supply roller 32 after application of a two-component adhesive and removal of solvents in a drier 33. When a predetermined length of the laminate 34 (depending on the circumference of the sleeve 18) has passed a sensor (not shown) along the advance path 31, the laminate is cut, whereafter the actual sheet covering device comprising a pressure roll 35 and control/drive thereof starts operating. The drive is basically obtained from a one-turn coupling 36 via chains 38 and gears 39, 40.

When the drive is activated, the pressure roll 35 is moved into frictional engagement with the mandrel 20 by switching over an arm 41, whereby a corresponding movement of the pressure roll 35 is produced by the clearance between the gears 39, 40. A support pin 45 is also guided into the end of the mnandrel 20.

Before the advancement of the cut laminate length starts, a treating device 42 (schematically indicated in FIG. 1) has started its operation and surface treated part of the circumference of the sleeve 18, thus when the laminate advancement/application starts, this occurs on a treated surface.

After the one-turn coupling 36 has finished its operation, the pressure roll 35 returns to its starting position by resetting of the arm 41, and the rotor 12 is again indexed one step. The position of pressure roll 35 shown in hatched lines in FIG. 1 indicates a possible service position maintained by the piston/cylinder 44, for instance when the laminate length is cut.

Anti-clockwise, in the following mandrel station, there occurs pressing of the laminate overlap joint on the sleeve by means of a pressure roll 46 movable along a generatrix of the sleeve. The roll 46 is moved by a linkage 47, which similarly to the linkage 23, is controlled and driven from the output shaft 24 of the indexing unit 25.

The linkage 47 also causes translational movement of the sleeve stripper 48 in the following, anti-clockwise mandrel position.

Finally, in the last mandrel position, before the supply position again is reached, it is checked that the stripping of the sleeve has taken place.

It will be appreciated that the invention is not restricted to the details described above with reference to the drawings but that numerous modifications and variations can be made without departing from the invention as defined in the following claims.

What we claim:

1. A method of covering with sheet material a tube having an angulate, essentially symmetrical and resiliently deformable cross-sectional shape, comprising the steps of temporarily deforming said angulate tube on a support means such that said tube assumes a substantially cylindrical cross-sectional shape, applying sheet material around substantially the entire circumference of said temporarily deformed tube for covering said tube with said sheet material, and permitting said tube to reassume its angulate cross-sectional shape.

2. A method as claimed in claim 1, wherein the sheet material application is an adhesive lamination using a two-component adhesive.

3. A method as claimed in claim 2, wherein the sheet material is essentially gas-tight and completely covers the circumference of the tube.

4. A method as claimed in claim 3, wherein the sheet material is a laminate of a metal foil and a plastics layer protecting the foil and is supplied with a two-component adhesive on the non-plastics coated side, solvent is removed from the laminate, the laminate is passed to the tube in a suitable length, the tube being rotated, and the laminate pressed against the rotating tube.

5. A method as claimed in claim 4, wherein the sheet material is applied in a sufficient length to provide an overlap, and the overlap joint is pressed against the tube by means of a pressure roll movable longitudinally along the tube.

6. A method as claimed in claim 1, wherein the sheet material is essentially gas-tight and completely covers the circumference of the tube.

7. A method as claimed in claim 6, wherein the sheet material is a laminate of a metal foil and a plastics layer protecting the foil and is supplied with a two-component adhesive on the non-plastics coated side, solvent is removed from the laminate, the laminate is passed to the tube in a suitable length, the tube being rotated, and the laminate pressed against the rotating tube.

8. A method as claimed in claim 6, wherein the sheet material is applied in sufficient length to provide an overlap, and the overlap joint is pressed against the tube by means of a pressure roll movable longitudinally along the tube.

9. A method as claimed in claim 1, wherein said angulate tube is temporarily deformed by mounting said tube on said support means comprising a cylindrical mandrel having a circumference corresponding substantially to an inner circumference of said angulate tube.

10. A method as claimed in claim 9, further comprising the step of removing said temporarily deformed tube from said mandrel to permit said tube to reassume its angulate cross-sectional shape.

* * * * *